(12) United States Patent
Todasco (10) Patent No.: US 10,552,920 B2
(45) Date of Patent: Feb. 4, 2020

(54) DETECTING LOCATION DATA OF CO-LOCATED USERS HAVING A COMMON INTEREST

(71) Applicant: PAYPAL, INC., San Jose, CA (US)

(72) Inventor: Michael Charles Todasco, Santa Clara, CA (US)

(73) Assignee: PayPal, Inc., San Jose, CA (US)

( * ) Notice: Subject to any disclaimer, the term of this patent is extended or adjusted under 35 U.S.C. 154(b) by 542 days.

(21) Appl. No.: 14/957,367

(22) Filed: Dec. 2, 2015

(65) Prior Publication Data

US 2017/0161846 A1 Jun. 8, 2017

(51) Int. Cl.
*G06Q 30/00* (2012.01)
*G06Q 50/00* (2012.01)
*G06Q 30/02* (2012.01)

(52) U.S. Cl.
CPC ......... *G06Q 50/01* (2013.01); *G06Q 30/0214* (2013.01); *G06Q 30/0215* (2013.01)

(58) Field of Classification Search
None
See application file for complete search history.

(56) References Cited

U.S. PATENT DOCUMENTS

| | | | | |
|---|---|---|---|---|
| 2005/0171954 A1* | 8/2005 | Hull | ......................... | H04L 51/32 |
| 2007/0087797 A1* | 4/2007 | Van Luchene | .......... | A63F 13/12 463/1 |
| 2007/0207780 A1* | 9/2007 | McLean | ................. | G06Q 30/02 455/414.1 |
| 2008/0012701 A1* | 1/2008 | Kass | ..................... | A61B 5/0002 340/539.11 |
| 2012/0239786 A1* | 9/2012 | Repasi | ................ | H04L 12/6418 709/219 |
| 2013/0339450 A1* | 12/2013 | Flinn | .................. | G06F 17/30699 709/204 |

(Continued)

OTHER PUBLICATIONS https://www.bruceclay.com/blog/beginners-guide-google-places-for-business/ Made Public on Jul. 1, 2013 https://www.bruceclay.com/blog/wp-content/uploads/2013/07/tae-kwon-1.jpg https://www.bruceclay.com/blog/wp-content/uploads/2013/07/tae-kwon-2.jpg (Year: 2013).*

(Continued)

*Primary Examiner* — Eric R Netzloff
*Assistant Examiner* — Christopher Stroud
(74) *Attorney, Agent, or Firm* — Haynes and Boone LLP (57) ABSTRACT

There are provided systems and methods for detecting location data of co-located users having a common interest. A interest may be determined for a first user, which may correspond to a subject matter (e.g., item, action, or other matter) that the first user has recently expressed interest in. A location of the first user may be determined for the user and, using the location, nearby users to the first user may be located. Using the nearby users, a service provider may determine whether any of the nearby users shared the interest in common with the first user. For example, a second user may have knowledge of the interest of the first user. Based on the knowledge that the second user has in the interest, the first user and the second user may be connected. The users may receive communication information and/or locations of the other user.

20 Claims, 5 Drawing Sheets

(56) References Cited

U.S. PATENT DOCUMENTS

2014/0172531 A1* 6/2014 Liberty .............. G06Q 20/3276
705/14.23
2014/0317189 A1* 10/2014 Pedraza ................ H04L 67/306
709/204
2014/0368601 A1* 12/2014 deCharms ............. H04W 4/021
348/14.02

OTHER PUBLICATIONS https://www.new-startups.com/ding-dong-chatting-location/—Ding Dong: Chatting by location—Dec. 19, 2013 (Year: 2013).*
https://apkpure.com/mapcute-find-chat-on-map/com.mapcute.app—_MapCute—Find & Chat on Map APK—Jun. 2, 2015 (Year: 2015).*
https://blog.allmyfaves.com/mobile/life-360-manage-the-chaos-of-your-daily-family-life/—Life 360:Manage the Chaos of your daily family life—Mar. 18, 2013 (Year: 2013).*
https://www.facebook.com/Getfixr/photos/a.1627818644116915/1665657270333052/?type=3&theater—Call Directly from Map View—GetFixr app—7/29/2-015 (Year: 2015).*

* cited by examiner

DETECTING LOCATION DATA OF CO-LOCATED USERS HAVING A COMMON INTEREST

TECHNICAL FIELD

The present application generally relates to processing of location data and past user information to generate user connections and more specifically to detecting location data of co-located users having a common interest.

BACKGROUND

Users may be interested in learning more about an item or purchasing an item, but may not be aware of other people having knowledge about the item that may be easily accessible by the user. In other situations, the user may appreciate being made aware of certain knowledge about an interest but have not yet begun to research the interest. For example, based on a user's past purchases, the user may be interested in new mobile phones, but not yet have heard about a certain brand of phone having characteristics that match the user's interests and preferences. Nearby users may have knowledge about the items and/or interests of a particular user, but without being made aware of the particular user's interests, the nearby users may not bring up the interests during conversation with the particular user. Additionally, although in some cases the nearby users may be friends, family, or other acquaintances of the particular user, the nearby user may be unaware of the particular user and thus be very unlikely to meet with the particular user to share their knowledge.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for detecting location data of co-located users having a common interest. Systems suitable for practicing methods of the present disclosure are also provided.

A user may have an interest in a subject, such as an item (e.g., goods, services, etc.), a category (e.g., cars, boats, etc.), an action (e.g., hiking, workouts, etc.), or other subject type. The user may indicate that the user has the interest to a service provider in one or more manners. For example, the user may establish preferences with the service provider that indicates that the user has a particular interest. The preferences may be stored with an account for the user with the service provider. However, in other embodiments, the service provider may instead determine the interest of the user based in indications provided by the user, which may be received or retrieved from another device/service and/or scraped from an online resource (e.g., a social networking/microblogging website, an online feed, an account with the service provider or another website, etc.). For example, the user's actions may be indicative of an interest, such as if the user goes hiking, begins running, visits a merchant retail location, attends an event, or otherwise performs some real world or online action. Such actions may be determined using a transaction history of the user, locations of the user, or other retrievable data, including data determined by a communication device and/or secondary device (e.g., a biometric detection device, such as a FITBIT®).

In further embodiments, the interest of the user may also be determined using purchases by the user, emails and messages sent or received by the user, social networking and microblogging posts by the user or mentioning the user, and/or other available data associated with the user. In addition to determining the interest, the service provider may determine an interest level in the interest by the user, which may correspond to a numerical or other quantifier (e.g., a level, amount, etc.) that quantifies an amount of interest that the user has in the interest. For example, the user may be strongly or weakly interested in the interest, or may have an assigned numerical quantifier of 7 out of 10 to an interest that the user is more strongly interested in. The interest level may be determined using similar interest information used to determine the interest, including the preference of the user and/or other available data (e.g., the actions, purchases, messages, or other retrievable data). The service provider may store the interest and the interest level, as well as further interests and interest levels, with the interest information for the user, which may be used to determine nearby users sharing a common interest with the user. In certain embodiments, the service provider may further determine an amount of knowledge or familiarity that the user has with the interest, which may correspond to a quantifier that similarly quantifies how knowledgeable or familiar the user is with the interest. For example, if the user just began hiking or shopping for a new car, the user may have a low knowledge level, while if the user often hikes or exercises or is an avid car enthusiast, the user may have a higher or more expected knowledge level with that interest.

Thus, the service provider may further receive location information for a plurality of users including the first user having the interest. The location information may be determined using devices of the users, which may include a GPS component or other location detection service. For example, a location of a user may be determined through the GPS component, or may be determined using a mapping application of the device. The devices may also use a connection component, which may detect a location and/or nearby devices through communications between devices, including accessing the same or similar WiFi network, short range wireless communications between devices (e.g., near field communications, Bluetooth, Bluetooth Low Energy, radio, infrared, etc.). In other embodiments, the user may set a work, home, or other location as well as location parameters, such as the proximity or area of the location. In addition to location information, the service provider may further receive a proximity range that each user sets to detect nearby users. The proximity range may be dependent on the location of the user, as well as a mode of transportation, time at the location, or other factor set by the user. For example, a user may set a proximity covering a work campus as the proximity to search for nearby users, may set a 10 mile radius nearby a home location that the user has access to a car, or may set a 1 mile radius to a new city that the user is visiting. The proximity may also be time dependent instead of distance, or may include other factors, such as traffic, route length, area restrictions, etc. The proximity set by the user may be used by the service provider to limit the search of nearby users. In other embodiments, the service provider may use preset proximities or may intelligently select the distance to search for nearby users using known information about or associated with the user.

Once the location of the first user is received, the service provider may use the location information for the plurality of users to search for nearby users. The nearby users may include users who have opted-in to receiving connections to other users based on shared interests. Thus, the first user having the interest and other users having knowledge about the interest may first be required to opt in or receive the option of opting in to the aforementioned service provided by the service provider. However, in other embodiments, all nearby users may be determined for the first user having the interest. Once the nearby users are determined, the service provider may determine if any of the nearby users have knowledge related to the interest of the first user.

Thus, the service provider may determine knowledge that the nearby users have in the interest. The service provider may determine the knowledge using knowledge information accessible for the nearby users. The knowledge information may similarly be determined using data determined, retrieved, received, and/or scraped from one or more devices, servers, and/or online resources associated with the nearby users. For example, whether the user has knowledge in an interest of another user may be determined using past actions by the user, past purchases by the user, and past locations visited by the user. In other embodiments, preferences set with an account of the user, social networking/microblogging posts by the user, and/or messages/emails for the user may also be used to determine whether the user has knowledge of the interest of the other user. The knowledge the user has in the interest may also be determined with what knowledge the user has, such as subject matter of the knowledge. Additionally, in certain embodiments, the service provider may further determine a knowledge level the user has in the interest, which similarly may correspond to a quantifier for the amount of knowledge that the user has in the interest.

If one or more of the nearby users has knowledge of the interest, the nearby user(s) having knowledge of the interest may be connected to the first user having the interest. For example, a second user having knowledge of the interest may be connected to the first user having the interest. The users may be connected by providing user information for one or more users to the other user. In such embodiments, the first user may receive a contact address for the second user, such as an email, phone number, messaging name, or other identifier including social networking/microblogging addresses. The first user may also receive personal information for the second user (e.g., name, picture, etc.). In further embodiments, the first user may also receive the knowledge that the second user has in the interest, as well as the knowledge level of the second user in the interest. Moreover, the second user may receive information for contacting the first user, as well as the interest of the first user, information of why that is an interest of the first user (e.g., online search engine search, purchase, etc.), and the interest level of the first user. One or more of the first and second users may receive location information for the other user. The location information may be displayed on a map to the user, such as a pin or address where the other user is located at on a map application. Moreover, the users may be connected using messages sent by the users and/or automated messages by the service provider using a messaging platform and/or social networking/microblogging service.

In certain embodiments, the first user and the second user may be matched based on their respective knowledge levels and/or interest levels. For example, if the first user is weakly interested in a subject matter and the second user prefers to only be connected to other users who are strongly interested in the subject matter, then the first user may not be matched to the second user. Similarly, if the second user prefers to be matched to users weakly interested in the subject matter in order to further entice or market the interest to the other users, the first user and the second user may be matched. The knowledge level of each user may also be used to determine if the users should be matched. Thus, if the first user has an interest is a subject matter, such as hiking or working out, and the first user is experienced in hiking/working out, the first user may only be matched to the second user if the second user's knowledge level is higher or superior to the first user. Moreover, if the first user has a low level of knowledge in the interest, and the second user would prefer only to be matched to users having a high level, the first user and the second user may not be matched. The preferences of the users may be set by the users with the service provider or may be learned over time based on the connection and non-connections made by the users. Other various combinations of interest and/or knowledge levels may be similarly utilized by the service provider with known preferences for the users in order to perform the matching and connecting of users.

The first user may be provided with more than one matching user having knowledge of the interest of the first user. For example, if more users than the second user within the nearby users having knowledge of the interest, the first user may receive each user matched to the first user. The first user may further see the knowledge that each user has and/or the knowledge level of each user to decide which user to connect with based on their respective knowledge/knowledge level. Moreover, the first user may further receive the location and/or personal information for each user, or may set preferences for certain types of connections. Thus, if the first user would prefer a gender, age, specific knowledge (e.g., Ford™ car knowledge, or hiking within working out), or other category preference, the first user may establish such preference, or the service provider may learn over time which preferences are preferred based on connections and non-connections made by the first user. In various embodiments, connecting the first user and the second user (and/or additional users sharing the interest) may generate a group through a messaging or online platform (e.g., an email group, social networking/microblogging group, etc.), which may include all the connected users. The group may further allow the members to recruit and invite further users sharing the interest, which may be updated based on changing locations by the users in a similar fashion as to that described above.

The second user may further receive incentives for connecting to the first user. An incentive may correspond to a discount, a payment from a merchant, digital currency, a digital value in a networking platform, a review, and a rating. For example, the interest may correspond to an item purchasable from a merchant. The merchant may utilize the aforementioned service of the service provider to advertise the item by providing a discount, rebate, or other incentive to the second user if the second user connects to the first user. In various embodiments, the merchant may further require the second user to provide proof of advertisement of the item to the first user, such as a review, code, or other information provided by the first user to the second user and/or merchant. The merchant may also only provide the incentive if the first user purchases the item, and may allow the first user to identify the second user when purchasing the item, such as through a name, identifier, code provided to the second user and given to the first user, or other manner.

Figure 1:
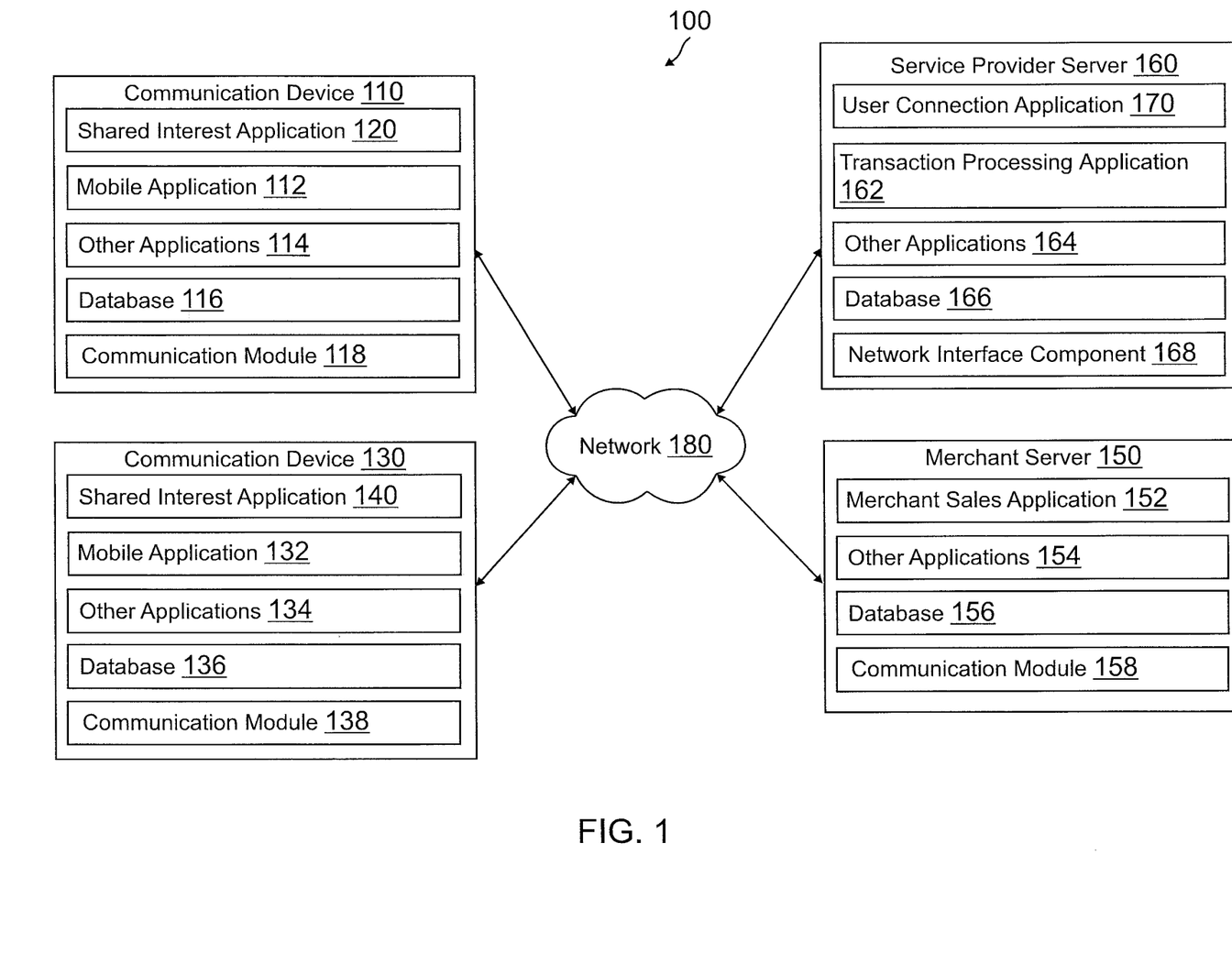
FIG. 1 is a block diagram of a networked system suitable for implementing the processes described herein, according to an embodiment.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user, a communication device 110, a communication device 130, a merchant server 150, and a service provider server 160 in communication over a network 180. The user may utilize communication device 110/130 to utilize the various features available for communication device 110/130, which may include processes and/or applications associated with connecting users based on shared interests. In this regard, service provider server 160 may be used to receive data for a first user (not shown) of communication device 110 that allows service provider server 160 to determine interests of the first user. Additionally, service provider server 160 may determine a location for the first user and nearby users. The nearby user may include a second user (not shown) associated with communication device 130. Service provider server 160 may receive similar data for the second user that allows service provider server 160 to determine whether the second user has knowledge of the interest of the first user. If the second user has knowledge of the interest of the first user, service provider server 160 may determine that the first user and the second user share an interest and may connect the first user and the second user.

Communication device 110, communication device 130, merchant server 150, and service provider server 160 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 180.

Communication device 110/130 may be implemented as a communication device that may utilize appropriate hardware and software configured for wired and/or wireless communication with communication device 110/130, merchant server 150, and/or service provider server 160. For example, in one embodiment, communication device 110/130 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although a communication device is shown, the communication device may be managed or controlled by any suitable processing device. Although only one communication device is shown, a plurality of communication devices may function similarly.

One of communication device 110/130 may act as the communication device of a first user having an interest shared with a second user having knowledge of the interest using the other one of communication device 110/130. With reference to the below figures, communication device 110 will be described as the device in possession of the first user having the interest. Moreover, communication device 110 will also be described as the device in possession of the second user sharing the interest with knowledge of the interest.

Communication device 110/130 of FIG. 1 contains a shared interest application 120/140, a mobile application 112/132, other applications 114/134, a database 116/136, and a communication module 118/138. Shared interest application 120/140, mobile application 112/132, and other applications 114/134 may correspond to executable processes, procedures, and/or applications with associated hardware. In other embodiments, communication device 110/130 may include additional or different modules having specialized hardware and/or software as required.

Shared interest application 120/140 may correspond to one or more processes to execute software modules and associated devices of communication device 110/130 to provide connections to users sharing an interest to a user, as well as set preferences for determining the connections with a service provider generating the connections (e.g., service provider server 160. In this regard, shared interest application 120/140 may correspond to specialized hardware and/or software utilized by a user of communication device 110/130 to first enter in preferences for determining connections with users having shared interests, and/or opt-in to a service of generating these connections with service provider server 160. For example, a first user may set an interest that the first user has, as well as experience, knowledge, purchases, actions, or other information about the interest that the user is in possession of. The first user may also choose to opt-in to receiving the connections with service provider server 160, for example, by enrolling in the service and/or establishing an account with service provider server 160. In other embodiments, after enrolling in the service provided by service provider server 160, the first user's interest, interest level in the interest, and/or knowledge of the interest may be determined by information retrieved by service provider server 160.

Additionally, the second user having knowledge of the interest and connected to the first user may use shared interest application 120/140. For example, the second user may similarly opt-in to being connected to users having an interest in subject matter that the second user has knowledge of. The second user may enroll in the service provided by service provider server 160 and/or may establish an account with the service provider. The second user may provide preferences and/or information about the knowledge the second user has in the shared interest. The knowledge information may include purchases, actions, experience, and/or other knowledge about the shared interest. However, in other embodiments, service provider server 160 may determine the knowledge information using retrievable information by service provider server 160.

Service provider server 160 may determine a connection between the first user and the second user using the shared interest by the first user and the second user, as well as an interest level in the shared interest by the first user, and/or a knowledge level in the shared interest by the first user and/or second user, as discussed herein. Once determined, service provider server 160 may provide the connection to the first user and/or the second user using shared interest application 120/140. The first user and the second user may use shared interest application 120/140 to view the connection. The connection may be displayed having a name, phone number, email address, messenger name, or other identifier for the other user. In further embodiments, the connection may be displayed with location information for the other user, which may be displayed through shared interest application 120/140 and/or another application of communication device 110/130 (e.g., a mapping application). Shared interest application 120/140 may facilitate the first user and the second user connecting, for example, through exchange of messages or other information. Additionally, shared interest application 120/140 may display an interest level, knowledge level, and/or previous knowledge (or other knowledge information) to the user.

Mobile application 112/132 may correspond to one or more processes to execute software modules and associated devices of communication device 110/130 to provide a mobile service to a user of communication device 110/130. In this regard, mobile application 112/132 may correspond to specialized hardware and/or software utilized by a user of communication device 110/130 that may be used to determine an interest of a user and/or determine knowledge that the user has in an interest based on information and/or services provided by mobile application 112/132. Thus, mobile application 112/132 may correspond to a mobile payment application configured to send and receive payments and/or purchase items. Thus, mobile application 112/132 may be used to receive purchase and/or payment information. However, in other embodiments, mobile application 112/132 may also correspond to a social networking, microblogging, email, mapping, or other application, which may determine user information, actions, communications, locations, or other information for use in determining an interest of a user, an interest level in the interest, and/or knowledge/a knowledge level associated with the interest. In various embodiments, mobile application 112/132 may include applications capable of providing short range wireless communications with another nearby device.

One or more of the aforementioned features and/or processes of shared interest application 120/140 may be included within mobile application 112/132 or vice versa, for example, to provide their respective features within one application and/or application interface.

In various embodiments, communication device 110/130 includes other applications 114/134 as may be desired in particular embodiments to provide features to communication device 110/130. For example, other applications 114/134 may include security applications for implementing client-side security features, programmatic client applications for interfacing with appropriate application programming interfaces (APIs) over network 180, or other types of applications. Other applications 114/134 may also include email, texting, voice and IM applications that allow a user to send and receive emails, calls, texts, and other notifications through network 180. In various embodiments, other applications 114/134 may include financial applications, such as banking, online payments, money transfer, or other applications. Other applications 114/134 may also include other location detection applications, which may be used to determine a location for the user, such as a mapping, compass, and/or GPS application, which can include a specialized GPS receiver that obtains location information for communication device 110/130 and processes the location information to determine a location of communication device 110/130 and the user. Other applications may include social networking applications, media viewing, and/or merchant applications.

Other applications 114/134 may also be associated with other devices, such as biometric devices and other types of accessible or connected devices. Other applications 114/134 may be utilized by other applications 114/134 to determine user data or other information, which may be communicated to service provider server 160. For example, other applications 114/134 may be associated with a secondary device, such as a FITBIT®. Thus, other applications 114/134 may collect, capture, and/or otherwise determine user data and other information for the user, which may be used to determine interests and knowledge in interests. The user's information may correspond to locations of the user, which may further be determined using a location determination system, such as a GPS module of communication device 110/130 and associated systems, calendaring/scheduling information, biometrics, etc. Other applications 114/134 may include device interfaces and other display modules that may receive input from the user and/or output information to the user. For example, other applications 114/134 may contain software programs, executable by a processor, including a graphical user interface (QUI) configured to provide an interface to the user. Other application 114/134 may therefore use devices of communication device 110/130, such as display devices, including GUI's capable of displaying information to users and other output devices, including speakers. Communication device 110/130 may include input devices, including touch screens. Communication device 110/130 may include a sensor or other component used to collect the current information associated with the user, such as an input device, a camera, a microphone, an accelerometer, a motion detector, an environmental sensor, and/or a biometric sensor.

Communication device 110/130 may further include database 116/136 stored to a transitory and/or non-transitory memory of communication device 110/130, which may store various applications and data and be utilized during execution of various modules of communication device 110/130. Thus, database 116/136 may include, for example, identifiers such as operating system registry entries, cookies associated with mobile application 112/132 and/or other applications 114/134, identifiers associated with hardware of communication device 110/130, or other appropriate identifiers, such as identifiers used for payment/user/device authentication or identification, which may be communicated as identifying communication device 110/130 to service provider server 160. Database 116/136 may include interest information, knowledge information, and/or other information used to determine an interest or knowledge in an interest. Additionally, database 116/136 may store account information and/or account preferences for an account with service provider server 160. Where applicable, information used by mobile application 112/132 may be stored to database 116/136 (e.g., messaging information, emails, etc.).

Communication device 110/130 includes at least one communication module 118/138 adapted to communicate with communication device 110/130, merchant server 150, and/or service provider server 160. In various embodiments, communication module 118/138 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118/138 may communicate directly with nearby devices using short range communications, such as Bluetooth Low Energy, LTE Direct, WiFi, radio frequency, infrared, Bluetooth, and near field communications.

Merchant server 150 may be implemented using any appropriate hardware and software configured for wired and/or wireless communication with communication device 110/130 and/or service provider server 160. Merchant server 150 may correspond to a device, server, or cloud computing architecture to provide sales of items, for example, through an online marketplace accessible over a network connection with merchant server 150. Merchant server 150 may further be used to process payments for items and provide incentives for purchase of items and/or advertisement of items to other users. Although a merchant server is shown, the merchant server may be managed or controlled by any suitable processing device. Although only one merchant server is shown, a plurality of merchant servers may function similarly.

Merchant server 150 of FIG. 1 contains a merchant sales application 152, other applications 164, a database 166, and a communication module 158. Merchant sales application 152 and other applications 164 may correspond to processes, procedures, and/or applications executable by a hardware processor, for example, a software program. In other embodiments, merchant server 150 may include additional or different modules having specialized hardware and/or software as required.

Merchant sales application 152 may correspond to one or more processes to execute modules and associated specialized hardware of merchant server 150 that provide a marketplace to sell one or more items offered by a merchant (not shown) associated with merchant server 150, and further provider checkout and payment processes for a transaction to purchase the items for sale from the merchant corresponding to merchant server 150. In this regard, merchant sales application 152 may correspond to specialized hardware and/or software of merchant server 150 to provide a convenient interface to permit a merchant offer items for sale. For example, merchant sales application 152 may be implemented as an application offering items for sale that may be accessed by communication device 110 to present the items for sale to the user associated with communication device 110. In certain embodiments, merchant sales application 152 may correspond to a website available over the Internet and/or online content and/or database information accessible through a dedicated application. Thus, sales module 160 may provide item sales through an online marketplace using the website of the merchant.

Merchant sales application 152 may include information for a price for the item, a discount for the item, a price change for the item, and/or other incentives for items and/or with the merchant corresponding to merchant server 150 (e.g., rebates, payments, etc.). Merchant sales application 152 may be used to set and/or determine a benefit or incentive provided to a user of communication device 110/130 for connecting to another user and advertising or teaching the other user about an interest of the other user. The benefit may be provided based on establishment of the connection and/or connecting to the other by a user having knowledge of the interest of the other user. However, in other embodiments, the benefit may only be provided based on a review or purchase by the other user. Thus, merchant sales application 152 may determine whether the user connected to the other user for purposes of the interest, for example, based on a purchase of the item and/or review of the user by the other user. The other user may identify the user to merchant sales application 152 using a name or other identifier. Additionally, the sales data and other item data may be retrievable by service provider server 160, such as requestable through an API call, retrievable from a database, and/or scraped from an online resource. The information may be based updated periodically or continuously, such as in real time and information for the item(s) for sale changes.

Merchant sales application 152 may be used to establish a transaction once the user associated with communication device 110/130 has selected one or more items for purchase. Once a payment amount is determined for the transaction for the item(s) to be purchased, merchant sales application 152 may request payment from the user. Merchant sales application 152 may receive payment processing information, such as a payment and a receipt. In such embodiments, the payment request may be processed, payment provided to the merchant account, and notification of payment (or failure, for example, where there are insufficient user funds) may be sent to merchant sales application 152. The payment may be made by service provider server 160 on behalf of the user associated with communication device 110. Merchant sales application 152 may then receive the results of the transaction processing, and complete the transaction with the user, for example, by providing the user the items for the transaction or declining the transaction where the user is not authenticated or the transaction is not authorized (e.g., insufficient funds).

Merchant server 150 includes other applications 164 as may be desired in particular embodiments to provide features to merchant server 150. For example, other applications 164 may include security applications for implementing server-side security features, programmatic client applications for interfacing with appropriate application programming interfaces (APIs) over network 150, or other types of applications. Other applications 164 may also include email, texting, voice and IM applications that allow a user to send and receive emails, calls, texts, and other notifications through network 150. In various embodiments, other applications 164 may include financial applications, such as banking, online payments, money transfer, or other applications associated with service provider server 160. Other applications 164 may contain software programs, executable by a processor, including a graphical user interface (GUI) configured to provide an interface to the user.

Merchant server 150 may further include database 166 which may include, for example, identifiers such as operating system registry entries, cookies associated with merchant sales application 152 and/or other applications 164, identifiers associated with hardware of merchant server 150, or other appropriate identifiers, such as identifiers used for payment/user/device authentication or identification. Identifiers in database 166 may be used by a payment/credit provider, such as service provider server 160, to associate merchant server 150 with a particular account maintained by the payment/credit provider. Item, sales, and/or benefit information for items sold by the merchant associated with merchant server 150 may be stored to database 166. Database 166 may further include transaction information and/or results, including transaction histories.

Merchant server 150 includes at least one communication module 158 adapted to communicate with communication device 110/130 and/or service provider server 160. In various embodiments, communication module 158 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 160 may be maintained, for example, by an online service provider, which may provide connection services on behalf of users. In this regard, service provider server 160 includes one or more processing applications which may be configured to interact with communication device 110/130, merchant device 150, and/or another device/server to facilitate connecting users having a shared interest. In one example, service provider server 160 may be provided by PAYPAL®, Inc. of San Jose, Calif., USA. However, in other embodiments, service provider server 160 may be maintained by or include another type of service provider, which may provide connection services to a plurality of users.

Service provider server 160 of FIG. 1 includes a user connection application 170, a transaction processing application 162, other applications 164, a database 166, and a network interface component 168. User connection application 170, transaction processing application 162, and other applications 164 may correspond to executable processes, procedures, and/or applications with associated hardware. In other embodiments, service provider server 160 may include additional or different modules having specialized hardware and/or software as required.

User connection application 170 may correspond to one or more processes to execute software modules and associated specialized hardware of service provider server 160 to determine connections between users sharing an interest based on interest information for a first user of communication device 110/130 and knowledge information for a second user of communication device 110l/130. In this regard, user connection application 170 may correspond to specialized hardware and/or software to receive and/or access location data and interest data for the first user. For example, the interest data may correspond to preferences set by a user for interests, such as selection of a subject matter (e.g., purchasable item, action, etc.) that the user is interest in, as well as an interest level in the interest (e.g., a quantifier of the first user's interest in the subject matter. However, in other embodiments, user connection application 170 may instead determine the interest of the user using data retrievable, receivable, and/or through scraping one or more online resources (e.g., other service providers, social networking/ microblogging services, etc.). For example, actions of the user may be determined, which may include locations of the user, exercise of the user, or other real world or online actions taken by the user. Additional data used to determine an interest of a user may include purchases by the user, emails and messages sent or received by the user, social networking and microblogging posts by the user or mentioning the user, and/or other available data associated with the user. Using the aforementioned information an interest of a user may be determined by processing the data to determine what subject matter the user is expressing interest in. Moreover, user connection application 170 may determine an interest level of the user in the interest, which may correspond to a quantifier of the user's interest in the subject matter.

After determining one or more interests of the first user, user connection application 170 may process the location data for the first user to determine nearby other users, including the second user of communication device 110/130. The first user may set a proximity around or nearby the first user that the first user is willing to use for connections with other users having knowledge of the first user's interest. However, in other embodiments, user connection application 170 may instead determine a range around the first user to locate other nearby users based on other information for the first user, such as a past history of connections to nearby users and the distance for the connection, nearby traffic or travel times, a transportation provider or current transportation of the user, or other information. In other embodiments, user connection application 170 may utilize a preset distance for the radius.

User connection application 170 may utilize location data for a plurality of other users when searching for nearby users to the first user. Once the nearby users are determined, user connection application 170 may access knowledge information for the nearby users and search the nearby users to determine one or more of the nearby users having a shared interest with the first user. For example, the second user may share one or more interests with the first user by having knowledge of the interest of the first user. User connection application 170 may connect the first user and the second user based on the shared connection. Connecting the first user and the second user may correspond to providing each user the other user's contact information, profile information, and/or interest/knowledge in the interest. The first user and the second user may also be connected through a platform, including a messaging platform, social networking platform, and/or other online platform. The first user and the second user may also receive location information for the other user, which may be displayed through a map application.

Additionally, the first user and the second user may be connected by user connection application 170 based on their respective interest level and/or knowledge level. For example, if the first user has a low interest and the second user prefers connections only with highly interested users in a subject matter, the first user and the second user may not be connected. In other embodiments, the first user may prefer that connected users have a high knowledge level in the interest. Thus, if the second user does not have a high enough knowledge level in the interest, the first user and the second user may not be connected. In other embodiments, the first user may have knowledge and/or a knowledge level in the interest of the first user, and may only be connected to the second user if the second user's knowledge/knowledge level is greater than or different from the first user's knowledge/knowledge level.

Additionally, user connection application 170 may provide an incentive and/or benefit to the second user if the second user connects with, advertises to, and/or causes a purchase of an item by the first user. User connection application 170 may utilize merchant server 150 to determine the benefit to provide the second user. The benefit may be provided to the second user through communication device 110/130 at the time of the connection between the first user and the second user. However, in other embodiments, the second user may only receive the benefit after a later action by the first user, such as the first user providing an identifier or other information for the second user after the second user connects to the first user. The benefit may also be provided when the first user purchases an item with merchant server 150. In other embodiments, the benefit may instead be provided by merchant server 150 to the second user after proof of the connection between the first user and the second user is provided to merchant server 150 (e.g., an identifier for identification of the communication).

Transaction processing application 162 may correspond to one or more processes to execute software modules and associated specialized hardware of service provider server 160 to establish, maintain, and provide a payment account to a user based on the user's payment instruments and provide payments using the payment account and/or payment instruments. In this regard, transaction processing application 162 may correspond to specialized hardware and/or software to receive information requesting establishment of the payment account. The information may include user personal and/or financial information. Additionally the information may include a login, account name, password, PIN, or other account creation information. The user may provide a name, address, social security number, or other personal information necessary to establish the account and/or effectuate payments through the account. Transaction processing application 162 may further allow the user to service and maintain the payment account, for example, by adding and removing payment instruments. Additionally, benefits received from merchant server 150 for connecting with another user may be stored and/or redeemed using transaction processing application 162.

In various embodiments, service provider server 160 includes other applications 164 as may be desired in particular embodiments to provide features to payment provider server 134. For example, other applications 164 may include security applications for implementing server-side security features, programmatic client applications for interfacing with appropriate application programming interfaces (APIs) over network 180, or other types of applications. Other applications 164 may contain software programs, executable by a processor, including a graphical user interface (GUI), configured to provide an interface to the user when accessing payment provider server 160, where the user or other users may interact with the GUI to more easily view and communicate information. In various embodiments, other applications 164 may include connection and/or communication applications, which may be utilized to communicate information to over network 180.

Additionally, service provider server 160 includes database 166. As previously discussed, the user and/or the merchant corresponding to telecommunication carrier server 170 may establish one or more digital wallets and/or payment accounts with service provider server 160. Digital wallets and/or payment accounts in database 166 may include user information, such as name, address, birthdate, payment instruments/funding sources, additional user financial information, user preferences, and/or other desired user data. Users may link to their respective digital wallets and/or payment accounts through an account, user, merchant, and/or device identifier. Thus, when an identifier is transmitted to service provider server 160, e.g. from communication device 110/130, one or more digital wallets and/or payment accounts belonging to the users may be found. Database 166 may also store the user preferences for the user, as well as interest data, knowledge data, and/or location data for a plurality of users.

In various embodiments, service provider server 160 includes at least one network interface component 168 adapted to communicate communication device 110/130 and/or merchant server 150 over network 180. In various embodiments, network interface component 168 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 180 may be implemented as a single network or a combination of multiple networks. For example, in various embodiments, network 180 may include the Internet or one or more intranets, landline networks, wireless networks, and/or other appropriate types of networks. Thus, network 180 may correspond to small scale communication networks, such as a private or local area network, or a larger scale network, such as a wide area network or the Internet, accessible by the various components of system 100.

Figure 2:
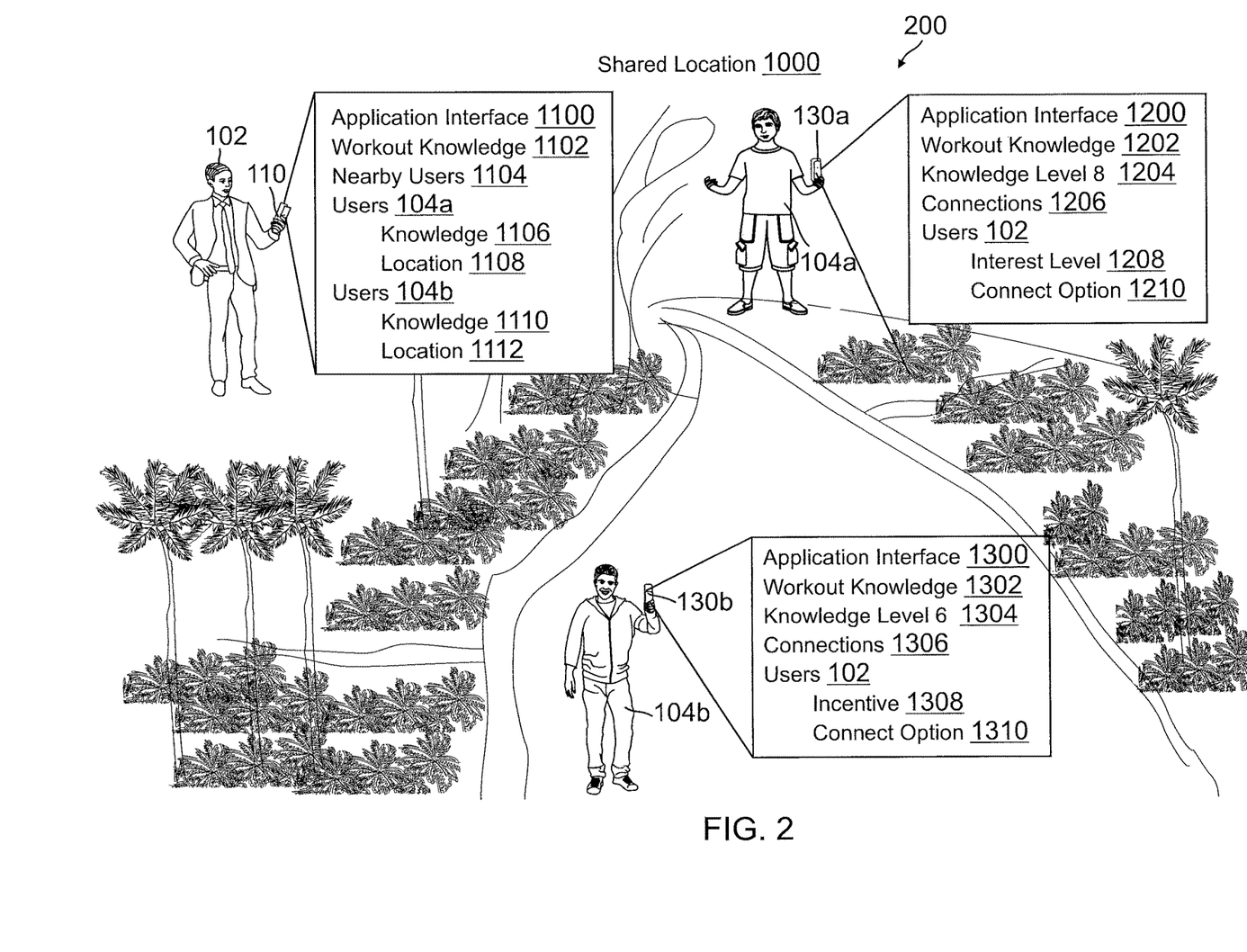
FIG. 2 is exemplary environment with a user having an interest and two nearby users possessing knowledge about the interest, according to an embodiment.

FIG. 2 is exemplary environment with a user having an interest and two nearby users possessing knowledge about the interest, according to an embodiment. Environment 200 includes a communication device 110, a communication device 130a, and a communication device 130b corresponding generally to communication device 110 and communication device 130 in environment 100 of FIG. 1. In this regard, a user 102 utilizing communication device 110 may have an interest that is shared with a user 104a utilizing communication device 130a and a user 104b utilizing communication device 130b.

The interest for user 102 may be determine based on data for user 102, such as preferences, parameters, actions, and/or other information. Communication device 110 may be used to set and/or adjust the interest, as well as display connections to user 102. For example, communication device 110 displays an application interface 1100. Application interface 1100 may correspond to a displayable graphical user interface (GUI) displayed though an output device of communication device 110. Application interface 1100 includes a workout interest 1102 of user 102. Moreover, once connections with user 104a and 104b are determined, the connections may be displayed on application interface 1100. In this regard, application interface 1100 includes nearby users 1104. Nearby users 1104 includes information for user 104a and user 104b. For example, knowledge 1106 for user 104a in the interest and location 1108 for user 104a may be displayed, while knowledge 1100 for user 104b in the interest and location 1112 for user 104b may also be displayed.

In order to connect user 102 to user 104a and/or user 104b, knowledge information for user 104a and user 104b may be determined. Knowledge information for user 104a and user 104b may be determined using information displayed within an application interface 1200 and an application interface 1300, respectively. For example, communication device 130a may display application interface 1200, which may display workout knowledge 1202 to user 104a. User 104a may adjust workout knowledge 1202 as well as view a knowledge level 1204 of 8 that user 104a has in the interest. In similar fashion, application interface 1300 includes workout knowledge 1302 that user 104b has in the interest, and a knowledge level 1304 for user 104b. User 102 may be connected to user 104a and/or user 104b based on workout knowledge 1202 and knowledge level 1204 for user 104a and/or workout knowledge 1302 and knowledge level 1304 for user 104b.

User 104a may also view connections 1206 generated by a service provider. The connections may include connections to users having an interest where user 104a has knowledge of the interest to share with the users. Thus, connections 1206 may include user 102 as a user having an interest. Connections 1206 having user 102 may also include information for interest level 1208 and connect option 1210. Similarly, connections 1206 for user 104b in application interface 1300 may also include user 102. However, for user 104b, information displayed within application interface 1300 may include incentive 1308 to connect with user 102, as well as another connect option 1310.

Figure 3:
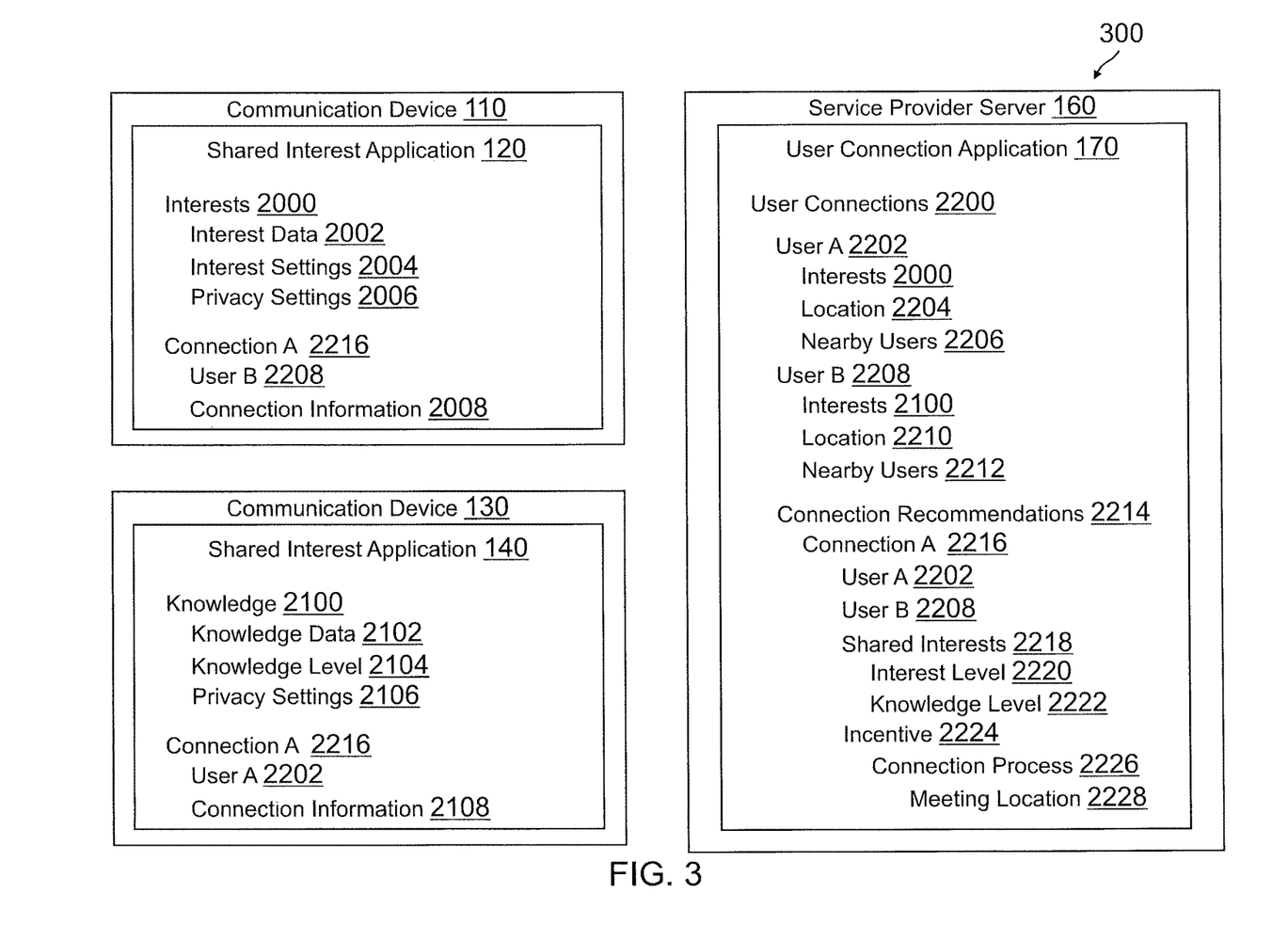
FIG. 3 is an exemplary system environment showing a communication device of a first user having an interest and a second user having knowledge of the interest that are connected based on information processed by a service provider, according to an embodiment.

FIG. 3 is an exemplary system environment showing a communication device of a first user having an interest and a second user having knowledge of the interest that are connected based on information processed by a service provider, according to an embodiment. FIG. 3 includes communication device 110, communication device 130, and a service provider server 160 all discussed in reference to environment 100 of FIG. 1.

Communication device 110 executes shared interest application 120 corresponding generally to the specialized hardware and/or software modules and processes described in reference to FIG. 1. In this regard, shared interest application 120 includes data used for establishing a connection to a user having a shared interest of the user of communication device 110. For example, shared interest application 120 may include interests 2000, which may correspond to interest information and other data to determine interests of a first user (User A not shown) associated with communication device 110. Interests 2000 may therefore include interest data 2002, interest settings 2004, and privacy settings 2006. Interest settings 2004 may be adjusted by the first user to change how service provider server 160 determines connections. Moreover, privacy settings 2006 may be utilized to opt-in and opt-out of receiving connections, as well as who the first user may be connected with and where/when.

Communication device 130 executes shared interest application 140 corresponding generally to the specialized hardware and/or software modules and processes described in reference to FIG. 1. In this regard, shared interest application 140 may similarly include data used for establishing a connection to a user having a shared interest of the user of communication device 130. However, in contrast to communication device 110, shared interest application 140 may include data for a user having knowledge of the interest and/or a knowledge level in the interest. Shared interest application 140 therefore includes knowledge 2100 for a second user (User B not shown) associated with communication device 130. Knowledge 2100 may correspond to the knowledge that the second user has in one or more of interests 2000. Thus, knowledge 2100 includes knowledge data 2102, knowledge level 2104, and privacy settings 2106. Similar to shared interests application 120, privacy settings 140 may be adjusted by the second user as desired.

Service provider server 160 executes user connection application 170 corresponding generally to the specialized hardware and/or software modules and processes described in reference to FIG. 1. In this regard, user connection application 170 includes user connections 2200 includes user A 2202 for communication device 110 and user B 2208 for communication device 130. User A 2202 may include interests 2000, as well as location 2204 for user A and nearby users 2206 determined using location 2204. Similarly, user B 2208 includes knowledge 2100, as well as location 2210 and nearby users 2212 determined using location 2210. Using the aforementioned information, user connection application 170 may determine connection recommendations 2214. Connection recommendations 2214 include connection A 2216 between user A and user B. Connection A 2216 includes user A 2202 (e.g., identifiers for user A) and user B 2208 (e.g., identifiers for user B). Additionally, connection A 2216 may also include shared interest 2218 between user A and user B, as well as an interest level 2220 for user A and a knowledge level 2222 for user B. Connection A 2216 may include an incentive 2224 for user B, as well as a connection process 2226 between the users, which may correspond to a meeting location 2228.

Using connection A 2216, user connection application 170 may communicate connection A 2216 to communication device 110 and communication device 130. Thus, shared interest application 120 includes connection A 2216 for user A, which may display user B 2208 (e.g., information and/or identifiers for user B) and connection information 2008 (e.g., shared interest 2218, knowledge level 2222 for user B, and/or connection process 2226). Shared interest application 140 may include connection A 2216 as well, which may include user A 2202 (e.g., information and/or identifiers for user A) and connection information 2108 (e.g., shared interest 2218, interest level 2220 for user A, and/or connection process 2226).

Figure 4:
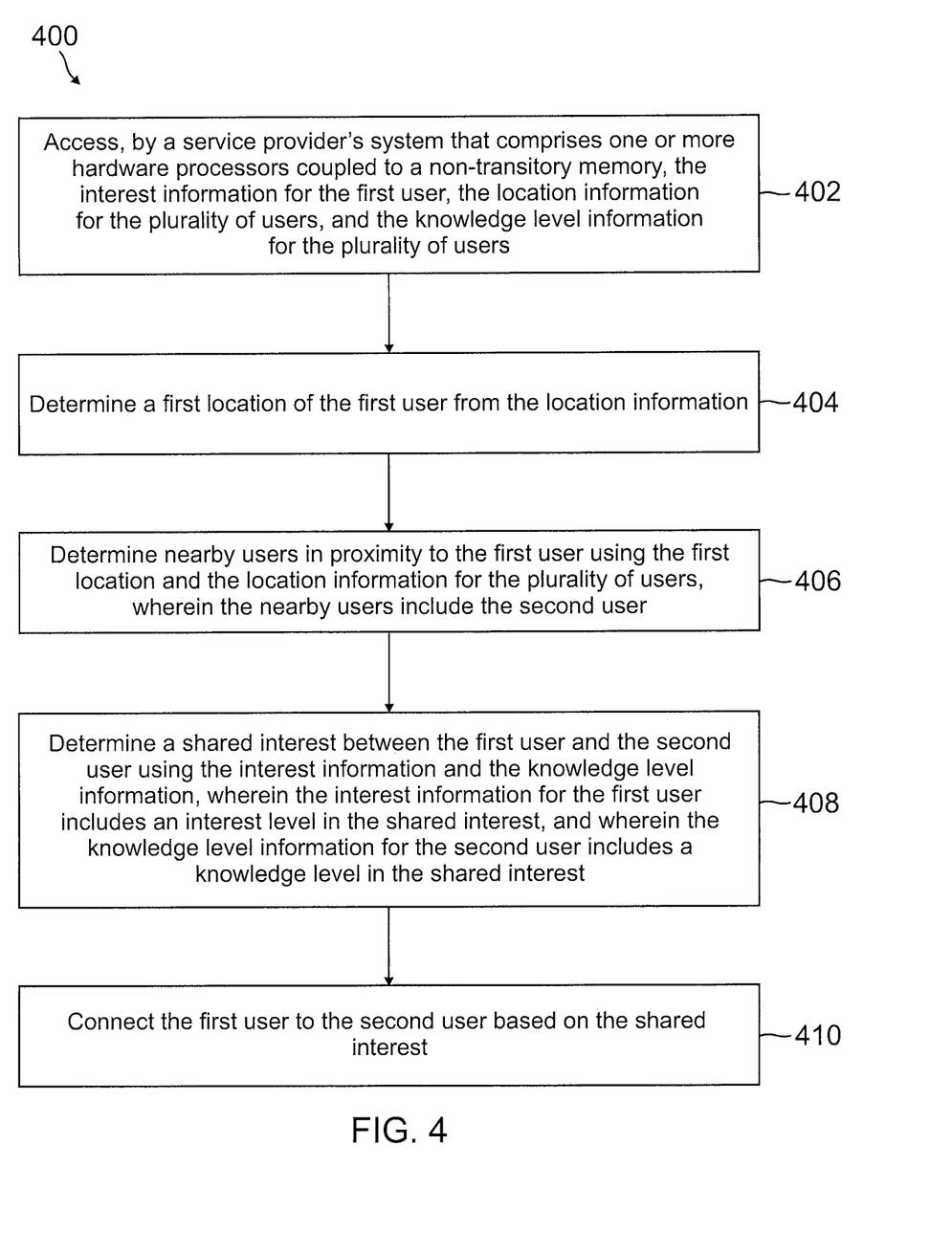
FIG. 4 is a flowchart of an exemplary process for detecting location data of co-located users having a common interest, according to an embodiment.

FIG. 4 is a flowchart of an exemplary process for detecting location data of co-located users having a common interest, according to an embodiment. Note that one or more steps, processes, and methods described herein may be omitted, performed in a different sequence, or combined as desired or appropriate.

At step 402, interest information for a first user, location information for a plurality of users, and knowledge level information for the plurality of users is accessed, by a service provider's system that comprises one or more hardware processors coupled to a non-transitory memory. A first location of the first user from the location information is determined, at step 404. At step 406, nearby users in proximity to the first user are determined using the first location and the location information for the plurality of users, wherein the nearby users include the second user. The proximity may be based on user preferences set by the first user. The proximity may also be determined based on at least one of a travel time to the first user, a time at the first location by first user, and short range wireless communications between a first device of the first user and a second device of the second user.

At step 408, a shared interest between the first user and the second user is determined using the interest information and the knowledge level information, wherein the interest information for the first user includes an interest level in the shared interest, and wherein the knowledge level information for the second user includes a knowledge level in the shared interest. The shared interest may comprise an item purchasable by the first user. A benefit to the second user may be provided based on the second user communicating to with the first user to sell or advertise the item to the first user. A report from the first user if the first user purchases the item based on the connecting the first user to the second user may be received, wherein the report is used to provide the benefit to the second user.

The knowledge level for the shared interest by the second user may be determined based on at least one of past actions by the second user, past purchases by the second user, and past locations visited by the second user. For example, the knowledge level may comprise one of a ranking, an amount, and an indicator associated with past experience the second user has in the shared interest. The interest level in the shared interest by the first user may be determined based on at least one of online searches conducted by the first user, purchases made by the first user, actions by the first user, messages associated with the first user, emails of the first user, social networking posts by the first user, and microblogging posts by the first user. In various embodiments, it may be determined if the knowledge level of the second user is higher than a current knowledge level of the first user in the shared interest, wherein the first user and the second user are connected when the knowledge level is higher than the current knowledge level.

Thus, at step 410, the first user and the second user are connected based on the shared interest. Connecting the first user and the second user may comprise determining a second location of the second user and communicating the second location to the first user. For example, the second location may be displayed on a map within an application interface of a mobile application executing on a mobile device of the first user, wherein the second location is displayed with the shared interest and the knowledge level of the first and second users. In certain embodiments, connecting the first user and the second user may comprise communicating additional knowledge the second user has in the shared interest to the first user based on the knowledge level. Additionally, the interest level may be communicated to the second user. The interest level may be communicated with an incentive comprising one of a discount, a payment from a merchant, digital currency, a digital value in a networking platform, a review, and a rating. Connecting the first user and the second user may establish a group for the shared interest. An opt-in request for the connecting the first user and the second user may be received prior to the connecting the first user and the second user. Connecting the first user to the second user may further be based on similar contacts between the first user and the second user, social networking contacts shared by the first user and the second user, and privacy settings of at least one of the first user and the second user.

Figure 5:
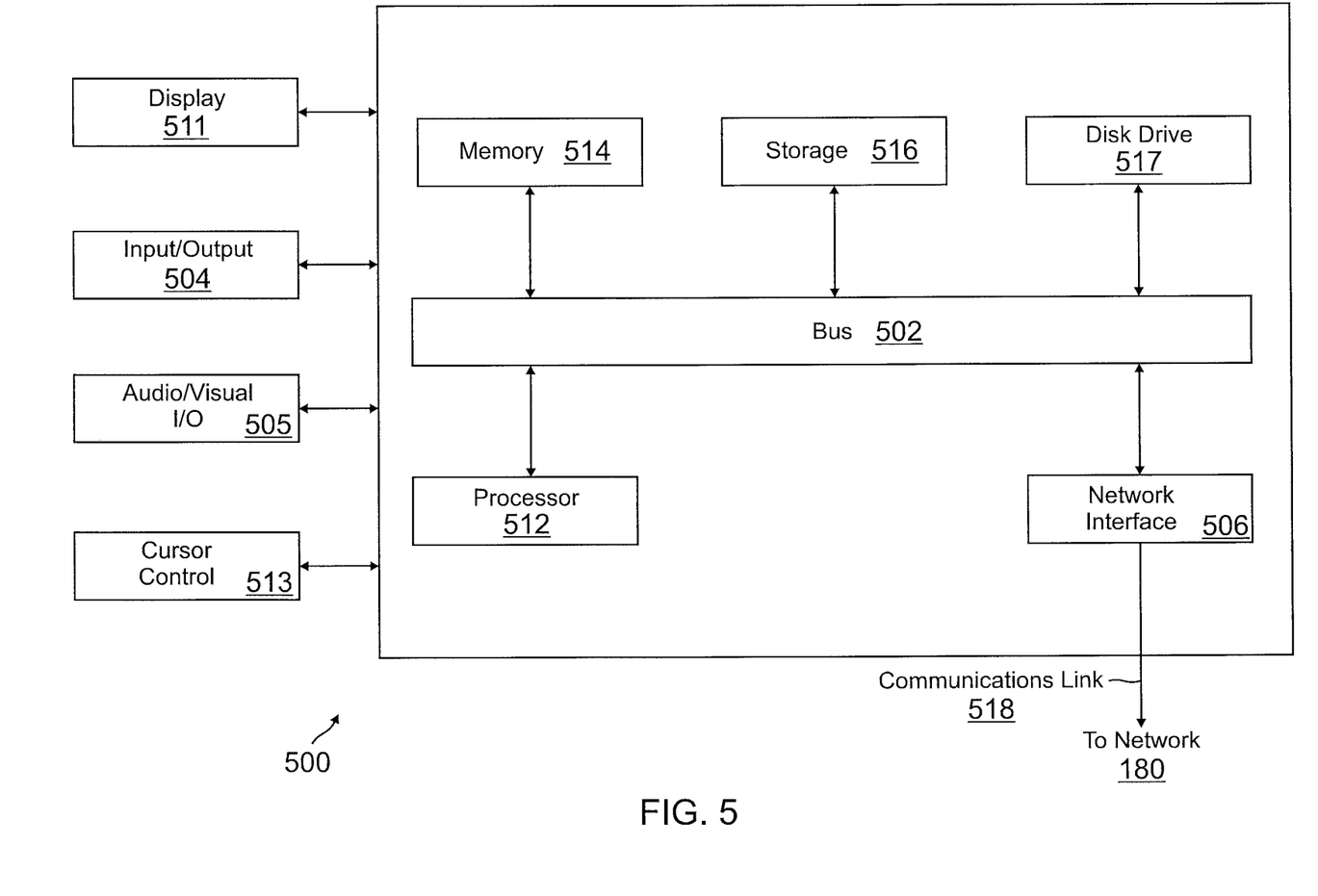
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 180. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
a non-transitory memory; and
one or more hardware processors coupled to the non-transitory memory and configured to read instructions from the non-transitory memory to cause the system to perform operations comprising:
accessing first interest information for a first user based on recorded sensor data obtained from a first user device associated with the first user, wherein the first interest information comprises a first interest level associated with a first interest and a first knowledge level associated with the first interest;
deriving a proximity range for detecting nearby users based on a communication range of a first connection component of the first user device;
determining that a second user is located within the derived proximity range from the first user based on a short-range wireless communication between the first connection component of the first user device and a second connection component of a second user device associated with the second user;
determining, based on the first interest information for the first user, that a second interest level of the second user associated with the first interest exceeds a predetermined interest level and a second knowledge level of the second user associated with the first interest exceeds a third knowledge level within a threshold amount of the first knowledge level;
providing, on the first user device, a first graphical user interface (GUI) presenting to the first user (i) the second knowledge level of the second user based on the determining that the second interest level exceeds the predetermined interest level and the second knowledge level exceeds the third knowledge level, (ii) an indication of a location of the second user on a map based on the determining that the second user is located within the derived proximity range from the first user, and (iii) an interactive element that enables the first user to select to connect with the second user;
in response to receiving a user interaction via the interactive element, connecting the first user with the second user by providing, on the first GUI and a second GUI displayed on the second user device, a messaging platform for facilitating communication between the first user and the second user within a message group via the first user device and the second user device;
monitoring the communication between the first user and the second user via the messaging platform;
determining that the second user advertises a product associated with the first interest based on the monitoring of the communication; and
in response to determining that the second user advertises the product associated with the first interest, providing on the second user device an incentive associated with the product.

2. The system of claim 1, wherein the proximity range is derived further based on an estimated travel time for the first user to travel to the second user.

3. The system of claim 1, wherein the proximity range is derived further based on at least one of a current time or a location of the first user.

4. The system of claim 1, wherein providing the messaging platform comprises providing a first messaging interface on the first GUI displayed on the first user device.

5. The system of claim 1, wherein
the second knowledge level associated with the first interest is based on a past purchase made by the second user.

6. The system of claim 1, wherein the second knowledge level comprises at least one of a ranking, an amount, or an indicator associated with past experience the second user has in the first interest.

7. The system of claim 1, wherein the first interest level of the first user in the first interest is derived further based on at least one of an online search conducted by the first user, a purchase made by the first user, a message associated with the first user, an email of the first user, a social networking post generated by the first user, or a microblogging post generated by the first user.

8. The system of claim 1, wherein the operations further comprise determining the third knowledge level by adding a predetermined amount to the first knowledge level of the first user associated with the first interest.

9. The system of claim 1, wherein connecting the first user with the second user further comprises communicating knowledge the second user has in the first interest to the first user device via the messaging platform.

10. The system of claim 1, wherein the operations further comprise:
in response to determining that the second knowledge level of the second user associated with the first interest exceeds the third knowledge level, presenting, on the second GUI displayed on the second user device, the first interest level of the first user.

11. The system of claim 10, wherein the incentive comprises at least one of a discount, a payment from a merchant, a monetary amount, or a digital value in a networking platform.

12. The system of claim 1, wherein the operations further comprise:
associating the message group with the first interest; and
including the first and second users in the message group.

13. A method comprising:
accessing, by one or more hardware processors, first interest information for a first user based on recorded sensor data obtained from a first user device associated with the first user, wherein the first interest information comprises a first interest level associated with a first interest and a first knowledge level associated with the first interest;
deriving, by the one or more hardware processors, a proximity range for detecting nearby users based on a communication range of a first connection component of the first user device;
determining, by the one or more hardware processors, that a second user and a third user are located within the derived proximity range from the first user based on short-range wireless communications between the first connection component of the first user device and a second connection component of a second user device associated with the second user, and between the first connection component and a third connection component of a third user device associated with the third user;
determining, by the one or more hardware processors based on the first interest information for the first user, that a second interest level of the second user associated with the first interest and a third interest level of the third user associated with the first interest exceed a predetermined interest level, and that a second knowledge level of the second user associated with the first interest and a third knowledge level of the third user in associated with the first interest exceed a fourth knowledge level within a threshold amount of the first knowledge level;
providing, by the one or more hardware processors on the first user device, a first graphical user interface (GUI) presenting to the first user (i) the second knowledge level of the second user and the third knowledge level of the third user based on the determining that the second interest level and the third interest level exceed the predetermined interest level and the second knowledge level and the third knowledge level exceed the fourth knowledge level, (ii) an indication of locations of the second user and the third user on a map based on the determining that the second user and the third user are located within the derived proximity range from the first user, and (iii) an interactive element that enables the first user to select to connect with at least one of the second user or the third user;
in response to receiving a user interaction via the interactive element, connecting, by the one or more hardware processors, the first user with the second user by providing, on the first GUI and a second GUI displayed on the second user device, a messaging platform for facilitating communication between the first user and the second user via the first user device and the second user device;
monitoring, by the one or more hardware processors, the communication between the first user and the second user via the messaging platform;
determining, by the one or more hardware processors, that the second user provides positive feedback for a product associated with the first interest based on the monitoring of the communication; and
in response to determining that the second user provides positive feedback for the product associated with the first interest, presenting, by the one or more hardware processors, on the second user device an incentive associated with the product.

14. The method of claim 13, wherein the first interest is associated with the product purchasable by the first user.

15. The method of claim 13, wherein determining that the second user provides positive feedback for the product comprises detecting a message transmitted by the second user to the first user via the messaging platform; and determining that the message comprises a promotion of a purchase of the product.

16. The method of claim 15, further comprising:
determining that the first user has purchased the product subsequent to the detected message, wherein the incentive is provided to the second user in response to determining that the first user has purchased the product.

17. The method of claim 13, wherein connecting the first user with the second user is further based on contacts shared between the first user and the second user and privacy settings of at least one of the first user or the second user.

18. The method of claim 13, wherein the recorded sensor data comprises biometric data of the user and location data obtained from the first user device recorded over a period of time indicating activities engaged by the first user during the first period of time.

19. The method of claim 13, further comprise:
in response to receiving a second user interaction via the interactive element, connecting the first user with the third user by configuring the messaging platform to include the third user in the message group.

20. A non-transitory machine-readable medium having stored thereon machine-readable instructions executable to cause a machine to perform operations comprising:
accessing first interest information for a first user based on recorded sensor data obtained from a first user device associated with the first user, wherein the first interest information comprises a first interest level associated with a first interest and a first knowledge level associated with the first interest;
deriving a proximity range for detecting nearby users based on a communication range of a first connection component of the first user;
determining that a second user is located within the derived proximity range from the first user based on a short-range wireless communication between the first connection component of the first user device and a second connection component of a second user device associated with the second user;
determining, based on the first interest information for first user, that a second interest level of the second user associated with the first interest exceeds a predetermined interest level and a second knowledge level of the second user associated with the first interest exceeds a third knowledge level within a threshold amount of the first knowledge level;
providing, on the first user device, a first graphical user interface (GUI) presenting to the first user (i) the second knowledge level associated with the second user based on the determining that the second interest level exceeds the predetermined interest level and the second knowledge level exceeds the third knowledge level, (ii) an indication of a location of the second user on a map based on the determining that the second user is located within the derived proximity range from the first user, and (iii) an interactive element that enables the first user to select to connect with the second user;

in response to receiving a user interaction via the interactive element, connecting the first user with the second user by providing, on the first GUI and a second GUI displayed on the second user device, a messaging platform for facilitating communication between the first user and the second user in a message group via the first user device and the second user device;

monitoring the communication between the first user and the second user via the messaging platform;

determining that the second user advertises a product associated with the first interest based on the monitoring of the communication; and in response to determining that the second user advertises the product associated with the first interest, providing on the second GUI displayed on the second user device an incentive associated with the product.

\* \* \* \* \*